US012210176B2

(12) United States Patent
Isojima et al.

(10) Patent No.: US 12,210,176 B2
(45) Date of Patent: Jan. 28, 2025

(54) PLASTIC FILM FOR OPTICAL APPLICATIONS, POLARIZATION PLATE, AND IMAGE DISPLAY DEVICE

(71) Applicant: DAI NIPPON PRINTING CO., LTD., Tokyo (JP)

(72) Inventors: Seiichi Isojima, Okayama (JP); Takashi Kuroda, Moriya (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 505 days.

(21) Appl. No.: 17/595,753

(22) PCT Filed: May 28, 2020

(86) PCT No.: PCT/JP2020/021067
§ 371 (c)(1),
(2) Date: Nov. 23, 2021

(87) PCT Pub. No.: WO2020/241732
PCT Pub. Date: Dec. 3, 2020

(65) Prior Publication Data
US 2022/0214486 A1 Jul. 7, 2022

(30) Foreign Application Priority Data
May 30, 2019 (JP) .................... 2019-101593

(51) Int. Cl.
*G02B 5/30* (2006.01)
(52) U.S. Cl.
CPC ........... *G02B 5/3083* (2013.01); *G02B 5/305* (2013.01)
(58) Field of Classification Search
CPC ........ G02B 5/3083; G02B 5/305; G02B 1/14; G02B 5/3041; B32B 7/023; G02F 1/133528; G02F 1/13363; G02F 1/1335
See application file for complete search history.

(56) References Cited

U.S. PATENT DOCUMENTS

2009/0213313 A1* 8/2009 Iwamoto ........... G02F 1/133634
349/118
2011/0128477 A1* 6/2011 Izaki .................... G02B 5/3083
349/96
(Continued)

FOREIGN PATENT DOCUMENTS

CN 107615118 1/2018
JP 2008-513833 5/2008
(Continued)

OTHER PUBLICATIONS

Rytöluto et al., âLarge-area Dielectric Breakdown Performance of Polymer Films â Part I: Measurement Method Evaluation and Statistical Considerations on Area-dependenceá IEEE Transaction on Dielectrics and Electrical Insulation, vol. 22, No. 2, Apr. 2015 (Year: 2015).*
(Continued)

*Primary Examiner* — Cara E Rakowski
*Assistant Examiner* — Jennifer A Jones
(74) *Attorney, Agent, or Firm* — HSML P.C.

(57) ABSTRACT

An optical plastic film can suppress rainbow unevenness when viewed with naked eyes and blackout when viewed with polarized sunglasses without high in-plane retardation. The film has an average of in-plane retardations of 600 nm or less and satisfies: when a sample with a size of 50 mm in length×50 mm in width is cut out of the film, slow axis directions are measured at a total of five points including four points 10 mm advanced from the four corners of the sample toward the center and the center of the sample, and angles formed by any one side of the sample with the slow axis directions at the measurement points are respectively defined as D1 to D5, the difference between the maximum value and the minimum value of D1 to D5 is 5.0 degrees or more.

20 Claims, 2 Drawing Sheets

(56) References Cited

U.S. PATENT DOCUMENTS

2018/0155511 A1 6/2018 Takeda et al.
2021/0132278 A1* 5/2021 Koo ........................ G02B 1/14

FOREIGN PATENT DOCUMENTS

| | | |
|---|---|---|
| JP | 2009-300611 | 12/2009 |
| JP | 2010-244059 | 10/2010 |
| JP | 2011-107198 | 6/2011 |
| JP | 4938151 B2 | 5/2012 |
| JP | 2012-133303 | 7/2012 |
| KR | 1020190055740 A | 5/2019 |
| WO | 2015156199 A1 | 10/2015 |
| WO | 2016/194488 | 12/2016 |

OTHER PUBLICATIONS

International Search Report of PCT/JP2020/021067, Aug. 11, 2020, 5 pages including English translation.
Notice of Reasons for Refusal issued for Japanese Patent Application No. 2021-522845, Dispatch date: Jul. 23, 2024, 5 pages including English machine translation.

* cited by examiner

PLASTIC FILM FOR OPTICAL APPLICATIONS, POLARIZATION PLATE, AND IMAGE DISPLAY DEVICE

TECHNICAL FIELD

The present invention relates to an optical plastic film, a polarizing plate, and an image display device.

BACKGROUND ART

In most cases, various optical plastic films are used for optical members of image display devices or the like. For image display devices including a polarizing plate on a display element, plastic films (polarizer-protecting films) for protecting a polarizer constituting the polarizing plate are used, for example.

Plastic films for image display devices typified by polarizer protective films preferably have excellent mechanical strength. Therefore, oriented plastic films are preferably used as plastic films for image display devices.

In the case where the oriented plastic film is disposed on the polarizer, there is a problem that rainbow pattern unevenness (rainbow unevenness) is observed due to the oriented plastic film disturbing the polarization state of linear polarized light that has passed through the polarizer. In order to solve such a problem, PTLs 1 to 3 have been proposed, for example.

CITATION LIST

Patent Literature

PTL 1: JP 2009-300611 A (paragraphs 0025 and 0026)
PTL 2: JP 2010-244059 A (paragraph 0056)
PTL 3: JP 2011-107198 A

SUMMARY OF INVENTION

Technical Problem

PTLs 1 and 2 suppress rainbow unevenness by disposing the absorption axis of the polarizer and the slow axis of the oriented plastic film so as to be parallel or perpendicular to each other.

However, in the case where the polarizer and the oriented plastic film are disposed so as to satisfy the relationship of PTLs 1 and 2, there is a problem that, when the image display device is visually recognized with polarized sunglasses, a phenomenon in which the screen turns black (blackout) occurs.

PTL 3 discloses a liquid crystal display device that can eliminate rainbow unevenness and blackout by using a specific white light source as the light source of the image display device, increasing the in-plane retardation (retardation) of the oriented plastic film to 3000 to 30000 nm, and disposing the absorption axis of the polarizer and the slow axis of the oriented plastic film at substantially 45 degrees.

However, the means of PTL 3 requires use of an oriented plastic film with a high in-plane retardation. Further, there is a problem that such an oriented plastic film with a high in-plane retardation is generally uniaxially oriented and thus easily ruptures in the orientation direction, or the like.

It is an object of the present invention to provide an optical plastic film, a polarizing plate, and an image display device, which can suppress rainbow unevenness when visually recognized with naked eyes and blackout when visually recognized with polarized sunglasses without high in-plane retardation.

Solution to Problem

As a result of dedicated studies, the inventors have found that the aforementioned problems are solved by intentionally imparting unevenness in the slow axis directions of the plastic film with low in-plane retardation.

The present invention provides an optical plastic film, a polarizing plate, and an image display device, as follows.

[1] An optical plastic film satisfying the following conditions 1 and 2:

Condition 1 when a sample with a size of 50 mm in length×50 mm in width is cut out of the plastic film, in-plane retardations are measured at a total of five points, including four points 10 mm advanced from the four corners of the sample toward the center and the other point located at the center of the sample, and the in-plane retardations at the five points are defined, respectively, as Re1, Re2, Re3, Re4, and Re5, the average of Re1 to Re5 is 600 nm or less; and

Condition 2 when the slow axis directions of the sample are measured at the five points, and angles formed by any one side of the sample with the slow axis directions at each of the five points are defined respectively as D1, D2, D3, D4, and D5, the difference between the maximum value of D1 to D5 and the minimum value of D1 to D5 is 5.0 degrees or more.

[2] The optical plastic film according to [1] above, further satisfying the following condition 3:

Condition 3 when retardations in the thickness direction of the sample at the five points are defined respectively as Rth1, Rth2, Rth3, Rth4, and Rth5, the average of Re1/Rth1, Re2/Rth2, Re3/Rth3, Re4/Rth4, and Re5/Rth5 is 0.10 or less.

[3] The optical plastic film according to [1] or [2] above, further satisfying the following condition 4:

Condition 4 when the retardations in the thickness direction of the sample at the five points are defined respectively as Rth1, Rth2, Rth3, Rth4, and Rth5, the average of Rth1 to Rth5 is 2000 nm or more.

[4] A polarizing plate including: a polarizer; a transparent protective plate A disposed on one side of the polarizer; and a transparent protective plate B disposed on the other side of the polarizer, wherein at least one selecting from the group consisting of the transparent protective plate A and the transparent protective plate B is the optical plastic film according to any one of [1] to [3] above.

[5] An image display device including: a display element; and a plastic film disposed in the light emitting surface side of the display element, wherein the plastic film is the optical plastic film according to any one of [1] to [3] above.

[6] The image display device according to [5] above, further including a polarizer between the display element and the plastic film.

Advantageous Effects of Invention

The optical plastic film, the polarizing plate, and the image display device of the present invention can suppress rainbow unevenness when visually recognized with naked eyes and blackout when visually recognized with polarized sunglasses without high in-plane retardation.

BRIEF DESCRIPTION OF DRAWINGS

FIG. 4 (A)-(C) are diagrams schematically illustrating the procedure of repeated folding test.

DESCRIPTION OF EMBODIMENTS

Hereinafter, embodiments of the present invention will be described.

Optical Plastic Film

The optical plastic film of the present invention satisfies the following conditions 1 and 2:

Condition 1 when a sample with a size of 50 mm in length×50 mm in width is cut out of the plastic film, in-plane retardations are measured at a total of five points, including four points 10 mm advanced from the four corners of the sample toward the center and the other point located at the center of the sample, and the in-plane retardations at the five points are defined, respectively, as Re1, Re2, Re3, Re4, and Re5, the average of Re1 to Re5 is 600 nm or less; and Condition 2 when the slow axis directions of the sample are measured at the five points, and angles formed by any one side of the sample with the slow axis directions at each of the five points are defined respectively as D1, D2, D3, D4, and D5, the difference between the maximum value of D1 to D5 and the minimum value of D1 to D5 is 5.0 degrees or more.

Measurement

Figure 1:
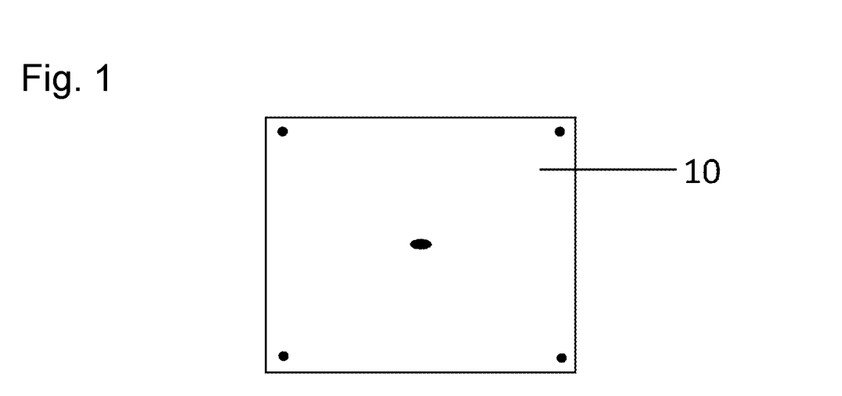
FIG. 1 is a plan view for illustrating the measurement positions at five points under conditions 1 and 2.

The samples with a size of 50 mm in length×50 mm in width used in the conditions 1, 2, and 3, which will be described below, are cut out of the plastic film at any positions. The measurement points at five points are a total of five points including one point at the center and four points 10 mm advanced from the four corners of each sample toward the center (five points shown by black dots in FIG. 1).

Measurements in each condition are performed in an atmosphere with a temperature of 23° C.±5° C. and a humidity of 40 to 65% RH. Before the measurements and evaluations, samples are exposed to the atmosphere for 30 minutes or longer.

The in-plane retardation (Re) in the condition 1 and the retardation in the thickness direction (Rth) in the condition 3 are represented by formulas (1) and (2) below using nx as the refractive index in the slow axis direction, which is a direction with the largest refractive index at each measurement point, ny as the refractive index in the fast axis direction, which is the direction orthogonal to the slow axis direction at each measurement point, nz as the refractive index in the thickness direction of the plastic film, and T [nm] as the thickness of the plastic film. Herein, in-plane retardation (Re) and retardation in the thickness direction (Rth) are values of them at a wavelength of 550 nm.

$$\text{In-plane retardation } (Re)=(nx-ny) \times T[\text{nm}] \quad (1)$$

$$\text{Retardation in thickness direction } (Rth)=((nx+ny)/2-nz) \times T[\text{nm}] \quad (2)$$

The slow axis direction, the in-plane retardation (Re), and the retardation in the thickness direction (Rth) can be measured, for example, by using "RETS-100", a product name, manufactured by Otsuka Electronics Co., Ltd., or "KOBRA-WR" or "PAM-UHR100", product names, manufactured by Oji Scientific Instruments.

When the in-plane retardation (Re) and so on are measured by using "RETS-100", a product name, manufactured by Otsuka Electronics Co., Ltd., it is preferable to prepare measurement according to (A1) to (A4) below.

(A1) First, to stabilize the light source of RETS-100, the light source is turned on and then left to stand for 60 minutes or longer. Thereafter, a rotating-analyzer method is selected together with a θ mode (a mode of retardation measurement in the angle direction and Rth calculation). As a result of selecting the θ mode, the stage functions as a tilted, rotating stage.

(A2) Subsequently, the following measurement conditions are inputted to RETS-100.

Measurement Conditions

Retardation measurement range: rotating-analyzer method
Measurement spot diameter: φ5 mm
Tilt angle range: 0°
Measurement wavelength range: 400 nm to 800 nm
Average refractive index of plastic film (e.g., for PET film, set N=1.617)
Thickness: thickness of separately measured by SEM or optical microscope (A3) Subsequently, background data are acquired with no sample set in the apparatus. With applying a closed system to the apparatus, this operation is carried out every time the light source is turned on.

(A4) Thereafter, a sample is set on the stage in the apparatus, and subjected to measurement.

In the condition 2, the one side of the sample that serves as a reference for the angles formed with the slow axis directions may be any of the vertical and horizontal sides of the sample as long as all of D1 to D5 use the same side as a reference.

The optical plastic film has, for example, a sheet-like form and a roll-like form. In any case, the sample with a size of 50 mm in length×50 mm in width may be cut out of any position of the plastic film. However, in the case where the vertical and horizontal directions of the sheet and the roll can be ascertained, the sample is cut out along such directions. For example, in the case of a roll, the conveyance direction (MD direction) of the roll can be regarded as the vertical direction, and the transverse direction of the roll (TD direction) can be regarded as the horizontal direction. Further, in the case where the conveyance direction and the transverse direction of the sheet can be ascertained, the conveyance direction can be regarded as the vertical direction, and the transverse direction can be regarded as the horizontal direction. In the case where it is difficult to ascertain the conveyance direction and the transverse direction of the sheet, and the sheet is rectangular or square, the vertical and horizontal directions may be ascertained by the four sides constituting the rectangle or square. In the case where it is difficult to ascertain the conveyance direction and the transverse direction of the sheet, and the sheet has a shape other than rectangle or square (such as circle and triangle), a rectangle or a square having the maximum area from which the shape does not protrude may be drawn, and the vertical direction or the transverse direction may be ascertained by the sides of the rectangular or square drawn.

In the case where a plurality of samples with a size of 50 mm in length×50 mm in width can be collected from a sheet-like plastic film, a ratio of samples satisfying the conditions 1 and 2 among the plurality of samples is preferably 50% or more, more preferably 70% or more, further preferably 90% or more, furthermore preferably 100% or more.

Further, in the case where a plurality of samples with a size of 50 mm in length×50 mm in width can be collected from a roll-like plastic film, samples collected at a predetermined position in the transverse direction of the roll preferably satisfy the conditions in most of the conveyance direction of the roll. Satisfying such a configuration enables the plastic film to exert effects of the present invention by picking up the plastic film at a predetermined position in the transverse direction of the roll. That is, the roll-like plastic film does not necessarily satisfy the conditions 1 and 2 throughout the transverse direction and needs only to satisfy the conditions 1 and 2 at least at a predetermined position in the transverse direction.

Condition 1

The condition 1 prescribes that the average of Re1 to Re5 is 600 nm or less. If the average of Re1 to Re5 is over 600 nm, rainbow unevenness when visually recognized with naked eyes cannot be suppressed at least within the region of the sample.

The average of Re1 to Re5 is preferably 300 nm or less, more preferably 250 nm or less, further preferably 200 nm or less. The lower limit of the average of Re1 to Re5 is not specifically limited but is generally about 50 nm, preferably 100 nm or more.

Re1 to Re5 are each preferably 600 nm or less, more preferably 300 nm or less, further preferably 250 nm or less, furthermore preferably 200 nm or less.

The difference between the maximum value of Re1 to Re5 and the minimum value of Re1 to Re5 is preferably 200 nm or less, more preferably 150 nm or less, further preferably 100 nm or less.

Condition 2

The condition 1 prescribes that the difference between the maximum value of D1 to D5 and the minimum value of D1 to D5 is 5.0 degrees or more. When the difference is less than 5.0 degrees, blackout when visually recognized with polarized sunglasses cannot be suppressed at least within the region of the sample.

Conventional optical plastic films are designed so that the slow axis directions are not shifted, whereas the optical plastic film of the present invention is different from the conventional optical films in that it is configured so that the slow axis directions are intentionally shifted. Further, the optical plastic film of the present invention is characterized in that it focuses on the unevenness of the slow axes in a comparatively small region of 50 mm in length×50 mm in width.

Further, satisfying the condition 2 can improve the bending resistance of the plastic film, which is preferred.

Meanwhile, in a general-purpose oriented film with the slow axes aligned, the film ruptures, or creasing due to bending strongly remains after the bending test. Specifically, a uniaxially oriented film as in PTL 3 ruptures when the bending test is performed along the slow axis, or creasing due to bending strongly remains when the bending test is performed in a direction orthogonal to the slow axis. Further, in a general-purpose biaxially oriented film, creasing due to bending strongly remains when the bending test is performed in a direction orthogonal to the slow axis.

The plastic film of the present invention can suppress creasing due to bending that remains after the bending test and rupture, regardless of the folding direction, which is preferred.

The difference between the maximum value of D1 to D5 and the minimum value of D1 to D5 is preferably 6.0 degrees or more, more preferably 8.0 degrees or more, further preferably 10.0 degrees or more.

When the difference between the maximum value of D1 to D5 and the minimum value of D1 to D5 is excessively large, there is a tendency that the orientation of the plastic film decreases, and the mechanical strength decreases. Therefore, the difference is preferably 20.0 degrees or less, more preferably 17.0 degrees or less, further preferably 15.0 degrees or less.

In the optical plastic film of one embodiment of the present invention, D1 to D5 are each preferably 5 to 30 degrees or 60 to 85 degrees, more preferably 7 to 25 degrees or 65 to 83 degrees, further preferably 10 to 23 degrees or 67 to 80 degrees.

Setting each of D1 to D5 to 5 degrees or more or 85 degrees or less can make it easy to suppress blackout when visually recognized with polarized sunglasses. Further, setting each of D1 to D5 to 30 degrees or less or 60 degrees or more can make it easy to prevent the decrease in mechanical strength due to the decrease in orientation of the plastic film.

The optical plastic film of one embodiment of the present invention preferably satisfies the following condition 3:

Condition 3 when the retardations in the thickness direction of the sample at the five points are respectively defined as Rth1, Rth2, Rth3, Rth4, and Rth5, the average of Re1/Rth1, Re2/Rth2, Re3/Rth3, Re4/Rth4, and Re5/Rth5 is 0.10 or less.

As a ratio (Re/Rth) of the in-plane retardation (Re) to the retardation in the thickness direction (Rth) decreases, the degree of orientation of the optical plastic film approaches even biaxial one. Accordingly, setting the ratio to 0.10 or less can impart good mechanical strength to the optical plastic film. The ratio is more preferably 0.07 or less, further preferably 0.05 or less. The lower limit of the ratio is about 0.01.

Re1/Rth1, Re2/Rth2, Re3/Rth3, Re4/Rth4, and Re5/Rth5 are each preferably 0.10 or less, more preferably 0.07 or less, further preferably 0.05 or less. The lower limit of each ratio is about 0.01.

The optical plastic film of one embodiment of the present invention preferably satisfies the following condition 4:

Condition 4 when the retardations in the thickness direction of the sample at the five points are respectively defined as Rth1, Rth2, Rth3, Rth4, and Rth5, the average of Rth1 to Rth5 is 2000 nm or more.

Satisfying the conditions 1 and 4 allow the degree of orientation of the optical plastic film to approach even biaxial one and can impart good mechanical strength to the optical plastic film. Further, satisfying the condition 4 can make it easy to suppress blackout when visually recognized from an oblique direction through polarized sunglasses.

The average of Rth1 to Rth5 is more preferably 3000 nm or more, further preferably 4000 nm or more. The upper limit of the average of Rth1 to Rth5 is about 10000 nm, preferably 8000 nm or less, more preferably 7000 nm or less.

Further, Rth1 to Rth5 are each preferably 2000 nm to 10000 nm, more preferably 3000 nm to 8000 nm, further preferably 4000 nm to 7000 nm.

The difference between the maximum value of Rth1 to Rth5 and the minimum value of Rth1 to Rth5 is preferably 200 nm or less, more preferably 150 nm or less, further preferably 100 nm or less.

Plastic Film

Examples of the layer configuration of the plastic film include a monolayer structure and a multilayer structure. Among them, a monolayer structure is preferable.

As described later, it is preferable for good mechanical strength and suppression of rainbow unevenness that the plastic film be an oriented plastic film having a small in-plane retardation. To provide an oriented plastic film with a small in-plane retardation, fine orientation control such as making the orientation approach evenness in the vertical direction and the horizontal direction is important. While the fine orientation control is difficult in multilayer structures because of the difference of physical properties and so on among layers, the mentioned control is easy in monolayer structures, which are preferred.

Examples of the resin component constituting the plastic film include polyester, triacetylcellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, polyurethane, and amorphous olefin (Cyclo-Olefin-Polymer: COP). Among them, polyester is preferred in that good mechanical strength is easily obtained. That is, it is preferable that the optical plastic film be a polyester film.

Examples of the polyester constituting the polyester film include polyethylene terephthalate (PET), polyethylene naphthalate (PEN), and polybutylene terephthalate (PBT). Among them, PET is preferred in that it is easy to control the in-plane retardation to a low value because of the low intrinsic birefringence.

The plastic film may contain an additive such as a UV-absorbing agent, a light stabilizer, an antioxidant, an antistatic agent, a flame retardant, a gelation inhibitor, and a surfactant.

The thickness of the plastic film is preferably 15 μm to 60 μm, more preferably 20 μm to 55 μm, further preferably 30 μm to 50 μm. Setting the thickness to 15 μm or more allows good mechanical strength with ease. Further, setting the thickness to 60 μm or less can make it easy to satisfy the condition 1.

The haze of the optical plastic film as defined in JIS K7136: 2000 is preferably 3.0% or less, more preferably 2.0% or less, and still more preferably 1.0% or less.

The total light transmittance of the optical plastic film as defined in JIS K7361-1: 1997 is preferably 80% or more, more preferably 85% or more, and still more preferably 90% or more.

To obtain good mechanical strength, the plastic film is preferably an oriented plastic film, and more preferably an oriented polyester film. Further, the oriented polyester film preferably has a monolayer structure of a polyester resin layer.

The oriented plastic film can be obtained by orienting a resin layer containing components constituting the plastic film. Examples of orienting methods include biaxial orienting such as successive biaxial orienting and simultaneous biaxial orienting and uniaxial orienting such as longitudinal uniaxial orienting. Among them, biaxial orienting is preferred because it is easy to obtain a low in-plane retardation and a high mechanical strength. Thus, it is preferable that the oriented plastic film be a biaxially oriented plastic film. Further, among biaxially oriented plastic films, biaxially oriented polyester films are preferred, biaxially oriented polyethylene terephthalate films are more preferred.

Successive Biaxial Orienting

In successive biaxial orienting, a casting film is oriented in the conveyance direction, and the film is then oriented in the transverse direction.

Orientation in the conveyance direction is typically achieved by rotational speed difference between oriented rolls, and may be carried out in one step, or carried out in multiple steps by using a plurality of oriented roll pairs. From the viewpoint of reducing unevenness of optical properties including in-plane retardation, it is preferable to bring a plurality of nip rolls close to the oriented rolls. The orientation ratio in the conveyance direction is typically 2 to 15 times, and, from the viewpoint of reducing excessive unevenness of optical properties including in-plane retardation, preferably 2 to 7 times, more preferably 3 to 5 times, and still more preferably 3 to 4 times.

From the viewpoint of reducing excessive unevenness of optical properties including in-plane retardation, it is preferable that the orientation temperature be from the glass transition temperature of the resin to the glass transition temperature+100° C. For PET, the orientation temperature is preferably 70 to 120° C., more preferably 80 to 110° C., and still more preferably 95 to 110° C.

Regarding the orientation temperature, reducing the orientation section at a low temperature, for example, by rapidly raising the temperature of the film tends to decrease the average of the in-plane retardations. Meanwhile, increasing the orientation section at a low temperature, for example, by slowly raising the temperature of the film tends to increase the orientation and the average of the in-plane retardations, while decreasing the unevenness in the slow axes.

It is preferable to use a heater that generates turbulent flow during heating for orientation. Heating with a wind containing turbulent flow causes a temperature difference in a minute region in the film surface to cause a minute shift in the orientation axes due to the temperature difference, thereby making it easy to satisfy the condition 2.

Functions including slidability, adhesiveness, and antistatic properties may be imparted to the film oriented in the conveyance direction through in-line coating. As necessary, surface treatment such as corona treatment, flame treatment, and plasma treatment may be applied before in-line coating.

A coating film formed in such in-line coating has a thickness as small as about 10 to 2000 nm (the coating film is further stretched through orientation treatment). Herein, such a thin layer is not counted as a layer constituting the plastic film.

For orientation in the transverse direction, a tenter method is used, wherein a film is oriented in the transverse direction while being conveyed with both ends of the film held with clips. The orientation ratio in the transverse direction is typically 2 to 15 times, and, from the viewpoint of reducing excessive unevenness of optical properties including in-plane retardation, preferably 2 to 5 times, more preferably 3 to 5 times, and still more preferably 3 to 4.5 times. It is preferable that the transverse orientation ratio be higher than the longitudinal orientation ratio.

It is preferable that the orientation temperature be from the glass transition temperature of the resin to the glass transition temperature+120° C., and it is preferable that the temperature increase as going from the upstream to the downstream. Specifically, as the section for lateral orientation is bisected, the difference between the temperature in the upstream and the temperature in the downstream is preferably 20° C. or more, more preferably 30° C. or more, still more preferably 35° C. or more, and even still more preferably 40° C. or more. For PET, the orientation temperature in the first step is preferably 80 to 120° C., more preferably 90 to 110° C., and still more preferably 95 to 105° C.

In order to impart flatness and dimensional stability, it is preferable to perform heat treatment for the plastic film subjected to successive biaxial orienting as above in a tenter at the orientation temperature or higher and lower than the melting point. Specifically, in the case of PET, heat fixation is preferably performed in the range from 150 to 255° C., more preferably in the range from 200 to 250° C. From the viewpoint of reducing excessive unevenness of optical properties including in-plane retardation, it is preferable to perform additional heat-treating orientation at 1 to 10% in the former half of the heat treatment.

After being subjected to the heat treatment, the plastic film is slowly cooled to room temperature and then wound. As necessary, relaxation treatment and so on may be used in combination in the heat treatment or slow cooling. The relaxation rate in the heat treatment is, from the viewpoint of reducing excessive unevenness of optical properties including in-plane retardation, preferably 0.5 to 5%, more preferably 0.5 to 3%, still more preferably 0.8 to 2.5%, and even still more preferably 1 to 2%. The relaxation rate in the slow cooling is, from the viewpoint of reducing excessive unevenness of optical properties including in-plane retardation, preferably 0.5 to 3%, more preferably 0.5 to 2%, still more preferably 0.5 to 1.5%, and even still more preferably 0.5 to 1.0%. The temperature in the slow cooling is, from the viewpoint of flatness, preferably 80 to 150° C., more preferably 90 to 130° C., still more preferably 100 to 130° C., and even still more preferably 100 to 120° C.

Simultaneous Biaxial Orienting

In simultaneous biaxial orienting, a casting film is introduced into a simultaneous biaxial tenter, conveyed with both ends of the film held with clips, and oriented simultaneously and/or stepwise in the conveyance direction and transverse direction. While there are simultaneous biaxial orienting machines of pantograph type, screw type, drive motor type, and linear motor type, those of drive motor type or linear motor type allow arbitrary change of the orientation ratio and relaxation treatment at any place, and are thus preferred.

The ratio of simultaneous biaxial orienting is typically 6 to 50 times in an area ratio, and, from the viewpoint of reducing excessive unevenness of optical properties including in-plane retardation, preferably 8 to 30 times, more preferably 9 to 25 times, still more preferably 9 to 20 times, and even still more preferably 10 to 15 times.

In simultaneous biaxial orienting, it is preferable for reduction of in-plane orientation difference to set the orientation ratio in the conveyance direction and that in the transverse direction to be identical to each other and set the orientation speeds in those directions to be almost identical to each other.

The orientation temperature in simultaneous biaxial orienting is, from the viewpoint of reducing excessive unevenness of optical properties including in-plane retardation, preferably from the glass transition temperature of the resin to the glass transition temperature+120° C. For PET, the orientation temperature is preferably 80 to 160° C., more preferably 90 to 150° C., and still more preferably 100 to 140° C.

In order to impart flatness and dimensional stability, it is preferable to perform heat treatment for the film subjected to simultaneous biaxial orienting subsequently in a heat fixation chamber in the tenter at the orientation temperature or higher and lower than the melting point. The conditions for the heat treatment are the same as the conditions for the heat treatment after successive biaxial orienting.

Flexibility

It is preferable for the plastic film not to undergo the occurrence of cracking or rupture after being subjected to 100000 cycles (more preferably, after being subjected to 300000 cycles) of the folding test shown in Examples. It is preferable for the plastic film that when a measurement sample thereof after being subjected to 100000 cycles (more preferably, after being subjected to 300000 cycles) of the folding test shown in Examples is placed on a horizontal table, the angle of edge warpage of the measurement sample from the table be 20 degrees or smaller, more preferably 15 degrees or smaller. If the angle of edge warpage of the sample is 15 degrees or smaller, this means being resistant to creasing due to bending. Further, it is preferable for the plastic film to exhibit the above-described results (no occurrence of cracking, rupture, or creasing due to folding, and the edge of the sample after the test raised at an angle of 20 degrees or less) in any of the average of the slow axis directions of the plastic film and the average of the fast axis directions.

Thickness

The optical plastic film is preferably 10 μm or more, more preferably 20 μm or more, further preferably 25 μm or more, in view of the mechanical strength. Further, the optical plastic film is preferably 100 μm or less, more preferably 75 μm or less, further preferably 50 μm or less, for being easy to satisfy the condition 1. Setting the thickness to 50 μm or less is preferable also for improving the flexibility.

Applications

The optical plastic film of the present invention can be used suitably as a plastic film of an image display device. As described above, the plastic film of the present invention can suppress rupture and creasing due to bending that remains after the bending test regardless of the folding direction and therefore can be used more suitably as a plastic film of a curved image display device or a foldable image display device.

Further, the optical plastic film of the present invention can be used suitably as a plastic film to be disposed in the light emitting surface side of a display element of an image display device. In this case, a polarizer is preferably provided between the display element and the optical plastic film of the present invention.

Examples of the plastic film of such an image display device include a plastic film used as a base material for various functional films such as a polarizer protective film, a surface protective film, an antireflection film, and a conductive film constituting a touch panel.

Optical Laminate

The optical plastic film of the present invention may further comprise a functional layer such as a protective layer, an antireflection layer, a hard coating layer, an antiglare layer, a retardation layer, an adhesive layer, a transparent conductive layer, an antistatic layer, and an antifouling layer, to form an optical laminate.

The functional layer of the optical laminate preferably include an antireflection layer. The antireflection layer is preferably disposed on the outermost surface on the side with the functional layer of the plastic film.

Having an antireflection layer as the functional layer of the optical laminate makes it easy to suppress rainbow unevenness.

Further, it is more preferable that the functional layer include a hard coating layer and an antireflection layer. In the case where the functional layer includes a hard coating layer and an antireflection layer, the hard coating layer and the antireflection layer are preferably disposed on the optical plastic film in this order.

A general-purpose hard coating layer and a general-purpose antireflection layer can be applied.

Polarizing Plate

The polarizing plate of the present invention includes: a polarizer; a transparent protective plate A disposed on one side of the polarizer; and a transparent protective plate B disposed on the other side of the polarizer, wherein at least one selecting from the group consisting of the transparent protective plate A and the transparent protective plate B is the optical plastic film of the present invention described above.

The polarizing plate is used, for example, in order to impart antireflection properties by combination with a $\lambda/4$ retardation plate. In this case, the $\lambda/4$ retardation plate is disposed on the display element of the image display device, and the polarizing plate is disposed on the viewer side of the $\lambda/4$ retardation plate.

Further, in the case where the polarizing plate is used for liquid crystal display devices, it is used for imparting the function of a liquid crystal shutter. In this case, the liquid crystal display device is disposed in the order of a lower polarizing plate, the liquid crystal display element, and an upper polarizing plate so that the absorption axis of the polarizer of the lower polarizing plate is orthogonal to the absorption axis of the polarizer of the upper polarizing plate.

In this configuration, it is preferable to use the polarizing plate of the present invention as the upper polarizing plate.

Transparent Protective Plate

The polarizing plate of the present invention uses the optical plastic film of the present invention described above as at least one selecting from the group consisting of the transparent protective plate A and the transparent protective plate B. In a preferred embodiment, the transparent protective plate A and the transparent protective plate B are each the optical plastic film of the present invention described above.

In the case where one of the transparent protective plate A and the transparent protective plate B is the optical plastic film of the present invention described above, the other transparent protective plate is not specifically limited but is preferably a transparent protective plate with optical isotropy. The "optical isotropy" refers to having an in-plane retardation of 20 nm or less, preferably 10 nm or less, more preferably 5 nm or less. Examples of the transparent base material with optical isotropy include an acrylic film and triacetyl cellulose (TAC) film.

Further, in the case where one of the transparent protective plate A and the transparent protective plate B is the optical plastic film of the present invention described above, the optical plastic film of the present invention described above is preferably used as the transparent protective plate on the light emitting side.

Polarizer

Examples of polarizers include sheet-type polarizers such as polyvinyl alcohol films, polyvinyl formal films, polyvinyl acetal films, and ethylene-vinyl acetate copolymer-based saponified films, which are dyed with iodine, etc., and oriented; wire grid type polarizers composed of many metal wires arranged in parallel; coating-type polarizers to which a lyotropic liquid crystal or a dichroic guest-host material is applied; and multilayer thin film type polarizers. Further, these polarizers may be reflection type polarizers provided with the function of reflecting the polarization component that is not transmitted.

The polarizer is preferably disposed so that the absorption axis thereof is substantially parallel or substantially perpendicular to any one side of a sample of the optical plastic film cut out by the above-described procedure. Being substantially parallel means being within 0 degrees±5 degrees, preferably being within 0 degrees±3 degrees, more preferably being within 0 degrees±1 degree. Being substantially perpendicular means being within 90 degrees±5 degrees, preferably being within 90 degrees±3 degrees, more preferably being within 90 degrees±1 degree.

Image Display Device

The image display device of the present invention includes: a display element; and a plastic film disposed in the light emitting surface side of the display element, wherein the plastic film is the optical plastic film of the present invention described above.

Figure 2:
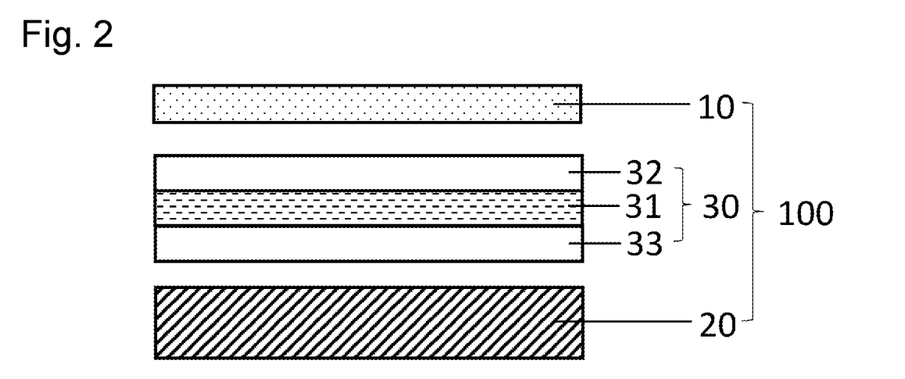
FIG. 2 is a cross-sectional view illustrating an embodiment of the image display device of the present invention.
Figure 3:
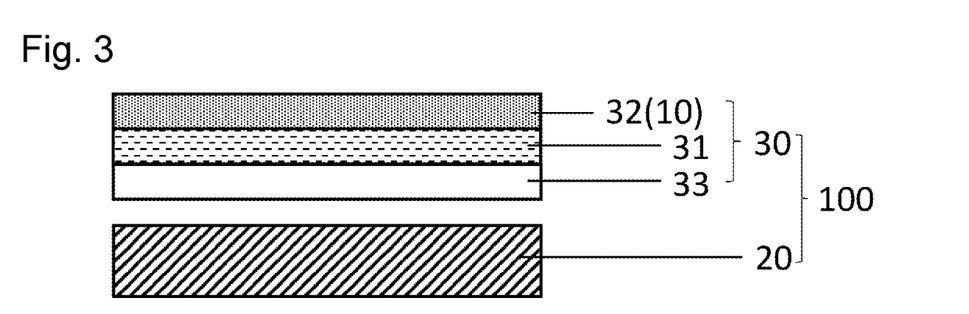
FIG. 3 is a cross-sectional view illustrating another embodiment of the image display device of the present invention.

FIG. 2 and FIG. 3 are each a sectional view showing an embodiment of an image display device 100 of the present invention.

The image display device 100 in FIG. 2 and FIG. 3 includes an optical plastic film 10 in the light emitting surface side (upper side in FIG. 2 and FIG. 3) of a display element 20. In each of FIG. 2 and FIG. 3, the image display device 100 includes a polarizer 31 between the display element 20 and the optical plastic film 10. In each of FIG. 2 and FIG. 3, a transparent protective plate A (32) or a transparent protective plate B (33) is laminated on each surface of the polarizer 31. For the image display device in FIG. 3, the optical plastic film 10 is used as the transparent protective plate A (32).

The image display device 100 is not limited to the forms of FIG. 2 and FIG. 3. Although each member constituting the image display device 100 is disposed at a certain interval in each of FIG. 2 and FIG. 3, for example, the respective members may be integrated, for example, via adhesive layers. The image display device may include a member not shown (another plastic film, functional layer, or the like).

Display Element

Examples of the display element include liquid crystal display elements, EL display elements (organic EL display elements, inorganic EL display elements), and plasma display elements, and further examples are LED display elements such as micro-LED display elements.

If the display element of the display device is a liquid crystal display element, a back light is required in the surface of the liquid crystal display element in the opposite side to the resin sheet.

The image display device may be an image display device provided with a touch-panel function.

Examples of the types of touch panels include resistance film type, capacitance type, electromagnetic induction type, infrared type, and ultrasonic type.

A touch-panel function may be imparted within the display element as in-cell touch-panel liquid crystal display elements, and a touch panel may be placed on the display element.

As described above, the optical plastic film of the present invention can suppress rupture and creasing due to bending that remains after the bending test. Therefore, in the case of being a curved image display device or a foldable image display device, the image display device of the present invention can exert a more outstanding effect, which is preferred.

In the case where the image display device is a curved image display device or a foldable image display device, the display element is preferably an organic EL display element.

Plastic Film

The image display device of the present invention includes the optical plastic film of the present invention described above in the light emitting surface side of the display element. Only one piece or two pieces or more of the plastic film may be used.

Examples of the plastic film disposed in the light emitting surface side of the display element include a plastic film used as a base material for various functional films such as a polarizer protective film, a surface protective film, an antireflection film, and a conductive film constituting a touch panel.

Other Plastic Films

The image display device of the present invention may include other plastic films without inhibiting the effects of the present invention.

The other plastic films are preferably those with optical isotropy.

EXAMPLES

Next, the present invention will be described in more detail with reference to Examples; however, the present invention is not limited in any way by these Examples.

1. Measurements, Evaluation

In the following measurements and evaluations, an atmosphere with a temperature of 23° C.±5° C. and a humidity of 40 to 65% RH was used. Before the measurements and evaluations, samples were exposed to the atmosphere for 30 minutes or longer.

1-1. In-Plane Retardation (Re), Retardation in Thickness Direction (Rth), and Slow Axis Direction A sample of 50 mm in length×50 mm in width was cut from the optical plastic film of each of Examples and Comparative Examples fabricated or prepared in "2" described later. At this time, the conveyance direction (MD direction) of the plastic film was regarded as the vertical direction, and the transverse direction (TD direction) of the plastic film was regarded as the horizontal direction. The in-plane retardations, the retardations in the thickness direction, and the slow axis directions were measured at a total of five points including four points 10 mm advanced from the four corners of the cut sample toward the center and the center of the sample. Table 1 shows the average of Re1 to Re5 or the like calculated from the measurement results. The measuring device used was "RETS-100 (measurement spot: 5 mm in diameter), a product name, manufactured by Otsuka Electronics Co., Ltd. The slow axis directions were measured in a range of 0 to 90 degrees, taking the conveyance direction (MD direction) of the plastic film as a reference of 0 degrees.

1-2. Rainbow Unevenness

A sample (sample fabricated in 1-1) cut out of the optical plastic of each of Examples and Comparative Examples was disposed on the polarizing plate on the viewer side of the image display device with the following configuration, so that the TD direction of the sample was parallel to the horizontal direction of the screen. Then, the image display device was turned on in a dark room environment and observed with naked eyes from various angles to evaluate the presence or absence of rainbow unevenness based on the following criteria.

A: No rainbow unevenness visually recognized.
B: Rainbow unevenness visually recognized in a part of the region.
C: Rainbow unevenness visually recognized in most of the region.

Configuration of Image Display Device (1) Backlight source: white LED or cold-cathode tube
(2) Polarizing plate on light source side: TAC films were included as protective films for both sides of a polarizer composed of PVA and iodine. It was disposed so that the direction of the absorption axis of the polarizer was perpendicular to the horizontal direction of the screen.

(3) Image display cells: liquid crystal cells
(4) Polarizing plate on viewer side: A polarizing plate including a TAC film as a polarizer protective film for a polarizer composed of PVA and iodine. It was disposed so that the direction of the absorption axis of the polarizer was perpendicular to the parallel direction of the screen.
(5) Size: 10 inches diagonal 1-3. Blackout A sample (sample fabricated in 1-1) cut out of the optical plastic of each of Examples and Comparative Examples was disposed on the polarizing plate on the viewer side of the image display device with the configuration shown in 1-2, so that the TD direction of the sample was parallel to the horizontal direction of the screen. Then, while the image display with the sample disposed was placed in the vertical direction, the image display device fabricated in each of Examples and Comparative Examples was visually recognized from the front through polarized sunglasses that absorb S polarization, to evaluate blackout based on the following criteria.
A: No blackout occurred throughout entire region.
B: Blackout occurred in a part of the region.
C: Blackout occurred in most of the region.

1-4. Flexibility

TD Direction

A strip-shaped sample of 30 mm in the short side (TD direction)×100 mm in the long side (MD direction) was cut out of the optical plastic film of each of Examples and Comparative Examples. The sample was fixed to a durability tester (product name: "DLDMLH-FS", manufactured by YUASA SYSTEM Co., Ltd.) at both ends (regions within 10 mm from each tip were fixed) in the short side (30 mm), and a repeated folding test involving 180-degrees folding was carried out in 100000 cycles. The folding frequency was 120 cycles per minute. More detailed procedures of the folding test are as follows. The TD direction substantially coincided with the average of the slow axis directions.

A strip-shaped sample after the folding test was placed on a horizontal table, and the angle of edge warpage of the sample from the table was measured. Table 1 shows the results. A sample that ruptured during the test was evaluated as "ruptured".

MD Direction

A strip-shaped sample of 30 mm in the short side (MD direction)×100 mm in the long side (TD direction) was cut out of the optical plastic film of each of Examples and Comparative Examples and evaluated as above.

Details of Folding Test

Figure 4:
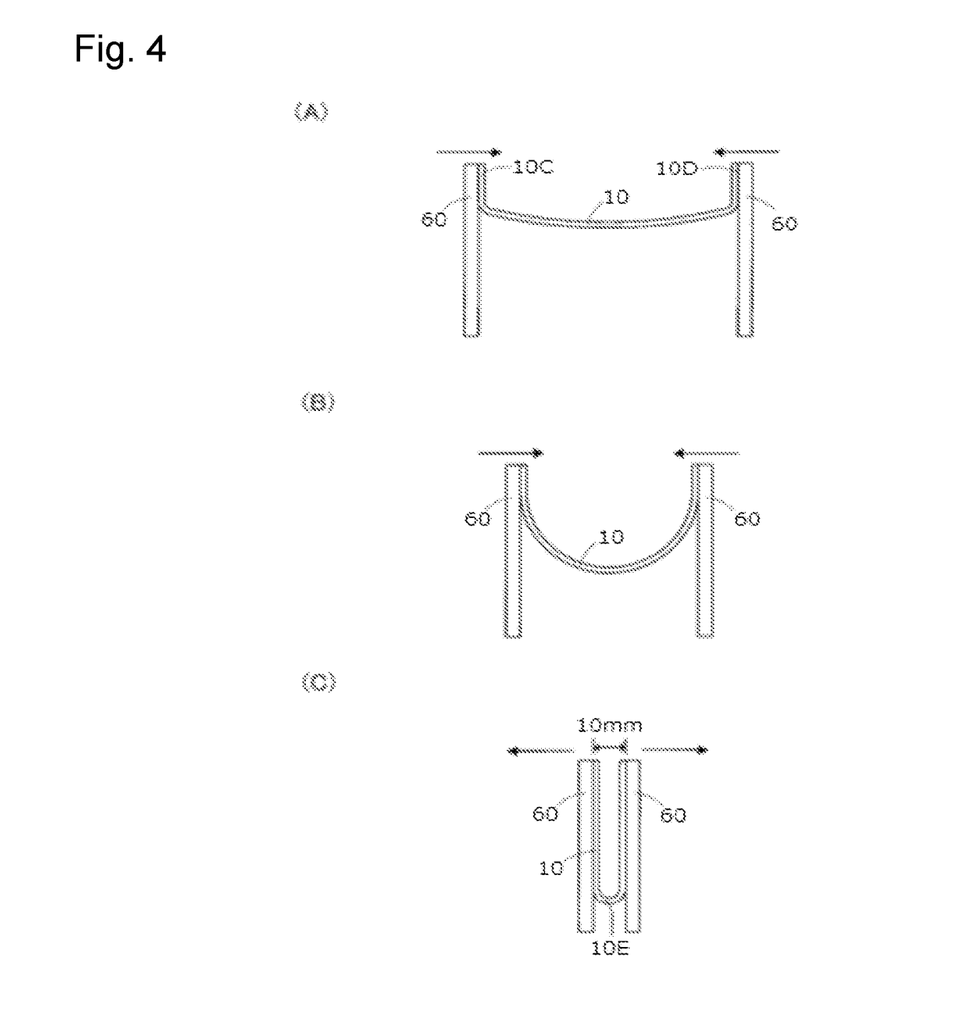

In the repeated folding test, as illustrated in FIG. 4(A), a side part 10C of a plastic film 10 and a side part 10D facing the side part 10C were fixed with fixing parts 60 disposed in parallel. The fixing parts 60 were slidable in the horizontal direction.
Next, as illustrated in FIG. 4(B), the fixing parts 60 were moved to bring close to each other, thereby deforming the plastic film 10 like folding. Further, as illustrated in FIG. 4(C), the fixing parts 60 were moved until the interval between the two side parts of the plastic film 10 facing each other and fixed with the fixing parts 60 reached 2 mm, and thereafter the fixing parts 60 were moved in the reverse direction to relieve the deformation of the plastic film 10.

The plastic film 10 can be folded at 180 degrees by moving the fixing parts 60 as illustrated FIG. 4(A) to (C). The interval between the two side parts of the plastic film 10 facing each other could be set to 2 mm by carrying out the repeated folding test in such a manner that the bending part 10E of the plastic film 10 did not protrude out of the lowest level of the fixing parts 60 while the interval when the fixing parts 60 come closest was controlled to 2 mm.

2. Fabrication and Preparation of Oriented Polyester Film

Example 1

With a kneader, 1 kg of PET (melting point 258° C., absorption center wavelength: 320 nm) and 0.1 kg of a UV-absorbing agent (2,2'-(1,4-phenylene) bis(4H-3,1-benzoxazinone-4-one) were melt-blended at 280° C. to produce pellets containing the UV-absorbing agent. The pellets and PET with a melting point of 258° C. were put into a uniaxial extruder, melt-kneaded at 280° C., extruded from a T-die, and cast on a casting drum the surface temperature of which was controlled to 25° C. to afford a casting film. The amount of the UV-absorbing agent in the casting film was 1 part by mass with respect to 100 parts by mass of PET.

The casting film obtained was heated with a group of rolls set to 95° C., then oriented in the conveyance direction at an orientation ratio of 3.3 times while both front and back sides of the film were heated with a radiation heater so that the film temperature at a point of 150 mm within a 400-mm orientation section (where the start point was an oriented roll A, the endpoint was an oriented roll B, and the oriented rolls A and B each had two nip rolls) was 103° C., and thereafter temporarily cooled. During heating with the radiation heater, air at 92° C. was blown at 4 m/s toward the film from the opposite side to the film through the radiation heater, to generate turbulent flow on the front and back sides of the film and disturb the temperature uniformity of the film.

Subsequently, both surfaces of the uniaxially oriented film were subjected to corona discharge treatment in air to set the wet tension of the base material film to 55 mN/m, and "a coating solution for slippery layers containing a polyester resin with a glass transition temperature of 18° C., a polyester resin with a glass transition temperature of 82° C., and silica particles with an average particle size of 100 nm" was applied to both surfaces of the film after being subjected to corona discharge treatment by in-line coating, and thus slippery layers were formed.

Next, the uniaxially oriented film was introduced into a tenter, pre-heated with hot air at 95° C., and then oriented in the transverse direction of the film at an orientation ratio of 4.5 times at a temperature of 105° C. in the first step and 140° C. in the second step. Here, two-step orientation was carried out in such a manner that as the section for lateral orientation was bisected, the degree of orientation of the film (film width at point of measurement—film width before orientation) at the intermediate point of the section for lateral orientation reached 80% of the degree of orientation at the end of the section for lateral orientation. The laterally oriented film was directly subjected to heat treatment with hot air in the tenter at stepwise heat treatment temperatures from 180° C. to 245° C., subsequently subjected to 1%-relaxation treatment in the transverse direction under the same temperature conditions, further rapidly cooled to 100° C., and then subjected to 1%-relaxation treatment in the transverse direction. Thereafter, the film was wound to afford an optical plastic film of Example 1 (biaxially oriented polyester film, thickness: 40 μm).

Example 2

An optical plastic film of Example 2 (biaxially oriented polyester film, thickness: 40 μm) was obtained in the same manner as in Example 1, except that the point at which the film temperature reached 103° C. was changed to a point of 200 mm within the 400-mm orientation section.

Example 3

An optical plastic film of Example 3 (biaxially oriented polyester film, thickness: 40 μm) was obtained in the same manner as in Example 1, except that the orientation ratio in the transverse direction was changed from 4.5 times to 5.5 times.

Comparative Example 1

As an optical plastic film of Comparative Example 1, a commercially available biaxially oriented polyester film (product name: COSMOSHINE A4100, manufactured by TOYOBO CO., LTD., thickness: 50 μm) was prepared.

Comparative Example 2

As an optical plastic film of Comparative Example 2, a commercially available uniaxially oriented polyester film (product name: COSMOSHINE TA048, manufactured by TOYOBO CO., LTD., with a thickness of 80 μm) was prepared.

Comparative Example 3

An optical plastic film of Comparative Example 3 (biaxially oriented polyester film with a thickness of 40 μm) was obtained in the same manner as in Example 1, except that the orientation ratio in the conveyance direction was changed from 3.3 times to 1.3 times, the air was not blown from the opposite side to the film through the radiation heater during heating with the radiation heater, and the orientation ratio in the transverse direction was changed from 4.5 times to 2.8 times.

Comparative Example 4

An optical plastic film of Comparative Example 4 (biaxially oriented polyester film with a thickness of 80 μm) was obtained in the same manner as in Example 1, except that the thickness of the casting film in Example 1 was increased, and the orientation ratio in the transverse direction was changed from 4.5 times to 5.5 times.

TABLE 1

| | | Example | | | Comparative Example | | | |
|---|---|---|---|---|---|---|---|---|
| | | 1 | 2 | 3 | 1 | 2 | 3 | 4 |
| In-plane retardation (nm) | Re1 | 186 | 218 | 586 | 2181 | 8125 | 256 | 1380 |
| | Re2 | 193 | 298 | 563 | 2196 | 8287 | 239 | 1362 |
| | Re3 | 197 | 285 | 579 | 2204 | 8221 | 243 | 1397 |
| | Re4 | 144 | 231 | 558 | 2210 | 8321 | 218 | 1405 |
| | Re5 | 110 | 246 | 545 | 2218 | 8329 | 231 | 1383 |
| | Condition 1: average of Re | 166 | 256 | 566 | 2202 | 8257 | 237 | 1385 |
| Slow axis direction (degree) | D1 | 76.93 | 78.44 | 81.40 | 58.37 | 89.51 | 83.92 | 75.58 |
| | D2 | 75.40 | 84.54 | 77.68 | 58.06 | 89.44 | 81.79 | 73.31 |
| | D3 | 76.90 | 83.93 | 73.98 | 58.24 | 89.55 | 82.66 | 68.74 |
| | D4 | 78.76 | 79.35 | 80.82 | 58.05 | 89.87 | 81.91 | 73.55 |
| | D5 | 68.34 | 81.40 | 79.13 | 56.88 | 89.55 | 82.04 | 74.27 |
| | Condition 2: maximum value − minimum value | 10.42 | 6.10 | 7.42 | 1.49 | 0.43 | 2.13 | 6.84 |
| Retardation in thickness direction (nm) | Rth1 | 6122 | 6115 | 7663 | 8017 | 8240 | 309 | 16633 |
| | Rth2 | 6139 | 6032 | 7601 | 7955 | 6883 | 301 | 16409 |
| | Rth3 | 6104 | 6040 | 7624 | 7869 | 7176 | 325 | 16527 |
| | Rth4 | 6129 | 6099 | 7639 | 7925 | 7890 | 318 | 16597 |
| | Rth5 | 6191 | 6064 | 7652 | 8014 | 7862 | 311 | 16402 |
| | Condition 4: average of Rth | 6137 | 6070 | 7636 | 7956 | 7610 | 313 | 16514 |
| Re/Rth | Re1/Rth1 | 0.030 | 0.036 | 0.076 | 0.272 | 0.986 | 0.828 | 0.083 |
| | Re2/Rth2 | 0.031 | 0.049 | 0.074 | 0.276 | 1.204 | 0.794 | 0.083 |
| | Re3/Rth3 | 0.032 | 0.047 | 0.076 | 0.280 | 1.146 | 0.748 | 0.085 |
| | Re4/Rth4 | 0.023 | 0.038 | 0.073 | 0.279 | 1.055 | 0.686 | 0.085 |
| | Re5/Rth5 | 0.018 | 0.041 | 0.071 | 0.277 | 1.059 | 0.743 | 0.084 |
| | Condition 3: average of Re/Rth | 0.027 | 0.042 | 0.074 | 0.277 | 1.090 | 0.760 | 0.084 |
| Evaluation | Rainbow unevenness | A | A | A | C | A | A | C |
| | Blackout | B | B | B | C | C | C | B |
| | Bending resistance (TD) | 10 degrees | 10 degrees | 15 degrees | 0 degrees | Ruptured | 55 degrees | 30 degrees |

TABLE 1-continued

|  | Example | | | Comparative Example | | | |
|---|---|---|---|---|---|---|---|
|  | 1 | 2 | 3 | 1 | 2 | 3 | 4 |
| Bending resistance (MD) | 10 degrees | 11 degrees | 15 degrees | 30 degrees | 55 degrees | 40 degrees | 30 degrees |

From the results of Table 1, it can be confirmed that the optical plastic films of Examples 1 to 3 can suppress rainbow unevenness when visually recognized with naked eyes and blackout when visually recognized with polarized sunglasses without high in-plane retardation. Further, it can be confirmed that the optical plastic films of Examples 1 to 3 can suppress rupture and creasing due to bending that remains after the bending test, regardless of the folding direction.

REFERENCE SIGNS LIST

10: optical plastic film
20: display element
30: polarizing plate
31: polarizer
32: transparent protective plate A
33: transparent protective plate B
50: housing
100: image display device

The invention claimed is:

1. A biaxially oriented ployethylene terephthalate optical film satisfying the following conditions 1 and 2:
Condition 1
  when a sample with a size of 50 mm in length×50 mm in width is cut out of the film, in-plane retardations are measured at a total of five points, including four points 10 mm advanced from the four corners of the sample toward the center and the other point located at the center of the sample, and the in-plane retardations at the five points are defined, respectively, as Re1, Re2, Re3, Re4, and Re5, the average of Re1 to Re5 is 600 nm or less; and
Condition 2
  when the slow axis directions of the sample are measured at the five points, and angles formed by any one side of the sample with the slow axis directions at each of the five points are defined respectively as D1, D2, D3, D4, and D5, the difference between the maximum value of D1 to D5 and the minimum value of D1 to D5 is 5.0 degrees or more, wherein
  (a) if the optical film is in the form of a sheet and multiple samples of 50 mm (length)× 50 mm (width) can be taken from the sheet, at least 50% of the samples taken satisfy Condition 1and Condition 2, and
  (b) if the optical film is in the form of a roll and multiple samples of 50 mm (length)×50 mm (width) can be taken from the roll, at leat 50% of the samples taken satisfy Condition 1and Condition 2.

2. The optical film according to claim 1, further satisfying the following condition 3:
<Condition 3
  when retardations in the thickness direction of the sample at the five points are defined respectively as Rth1, Rth2, Rth3, Rth4, and Rth5, the average of Re1/Rth1, Re2/Rth2, Re3/Rth3, Re4/Rth4, and Re5/Rth5 is 0.10 or less.

3. The optical film according to claim 1, further satisfying the following condition 4:
Condition 4
  when the retardations in the thickness direction of the sample at the five points are defined respectively as Rth1, Rth2, Rth3, Rth4, and Rth5, the average of Rth1 to Rth5 is 2000 nm or more.

4. A polarizing plate comprising:
a polarizer;
a transparent protective plate A disposed on one side of the polarizer; and
a transparent protective plate B disposed on the other side of the polarizer, wherein
at least one selecting from the group consisting of the transparent protective plate A and the transparent protective plate B is the optical film according to claim 1.

5. An image display device comprising:
a display element; and
a film disposed on the light emitting surface side of the display element, wherein
the film is the optical film according to claim 1.

6. The image display device according to claim 5, further comprising a polarizer between the display element and the film.

7. The optical film according to claim 1, wherein for (a) and (b) at least 70% of the samples taken satisfy Condition 1 and Condition 2.

8. The optical film according to claim 1, wherein for (a) and (b) at least 90% of the samples taken satisfy Condition 1 and Condition 2.

9. The optical film according to claim 1, wherein for (a) and (b) 100% of the samples taken satisfy Condition 1 and Condition 2.

10. The optical film according to claim 1, wherein the average of Re1 to Re5 is 50 nm or more.

11. The optical film according to claim 1, wherein each of Re1 to Re5 is 600 nm or less.

12. The optical film according to claim 1, wherein the difference between the maximum and minimum values of Re1 to Re5 is 200 nm or less.

13. The optical film according to claim 1, wherein the difference between the maximum and minimum values of D1 to D5 is 6.0 degrees or more and 20.0 degrees or less.

14. The optical film according to claim 1, wherein the difference between the maximum and minimum values of D1 to D5 is 8.0 degrees or more and 17.0 degrees or less.

15. The optical film according to claim 1, wherein the difference between the maximum and minimum values of D1 to D5 is 10.0 degrees or more and 15.0 degrees or less.

16. The optical film according to claim 1, wherein each of D1 to D5 is in a range of 5 to 30 degrees or in a range of 60-85 degrees.

17. The optical film according to claim 2, wherein each of Re1/Rth1, Re2/Rth2,Re3/Rth3, Re4/Rth4, and Re5/Rth5 is 0.10 or less and 0.01 or more.

18. The optical film according to claim 3, wherein each of Rth1 to Rth5 is 2000 nm or more and 10000 nm or less.

19. The optical film according to claim 3, wherein the difference between the maximum value of Rth1 to Rth5 and the minimum value of Rth1 to Rth5 is 200 nm or less.

20. The optical film according to claim 1, wherein a thickness of the optical film is in a range of 10 μm or more and 100 μm or less.

* * * * *